United States Patent [19]

Suzuki

[11] Patent Number: 4,476,952
[45] Date of Patent: Oct. 16, 1984

[54] FOUR-WHEEL VEHICLE DRIVE SYSTEM

[75] Inventor: Kunihiko Suzuki, Sagamihara, Japan

[73] Assignee: Nissan Motor Company, Limited, Yokohama, Japan

[21] Appl. No.: 430,726

[22] Filed: Sep. 30, 1982

[30] Foreign Application Priority Data

Nov. 25, 1981 [JP] Japan ................... 56-188939
Feb. 12, 1982 [JP] Japan ................... 57-20937

[51] Int. Cl.³ .................. B60K 17/34; B60K 23/08
[52] U.S. Cl. ........................ 180/247; 74/701
[58] Field of Search ............. 180/247, 248, 249, 250, 180/233, 297; 74/694, 700, 701

[56] References Cited

U.S. PATENT DOCUMENTS

| | | | |
|---|---|---|---|
| 3,993,152 | 11/1976 | Fogelberg | 180/249 |
| 4,415,058 | 11/1983 | Suzuki | 180/247 |
| 4,417,642 | 11/1983 | Suzuki | 180/249 |
| 4,420,059 | 12/1983 | Suzuki | 180/248 |
| 4,428,452 | 1/1984 | Muraoka et al | 180/249 |
| 4,431,079 | 2/1984 | Suzuki | 180/233 |
| 4,449,604 | 5/1984 | Suzuki | 180/233 |
| 4,457,394 | 7/1984 | Suzuki | 180/247 |
| 4,476,953 | 10/1984 | Hiraiwa | 180/249 |

FOREIGN PATENT DOCUMENTS

2074517A 11/1981 United Kingdom .
2092968A 8/1982 United Kingdom .

Primary Examiner—John A. Pekar
Attorney, Agent, or Firm—Lane, Aitken & Kananen

[57] ABSTRACT

A four-wheel drive system for a vehicle, comprising a laterally or transversely positioned engine, a power transmission gear unit including input and output shafts in lateral directions of the vehicle, a final reduction gear rotatable about an axis parallel with the transmission input and output shafts and adapted to be driven by the transmission output shaft, a main gear casing having enclosed therein the transmission gear unit and the final reduction gear, an auxiliary gear casing secured to the main gear casing, a main power transfer shaft enclosed in the auxiliary gear casing and rotatable about an axis aligned with the axis of rotation of the final reduction gear, a low-and-high speed shift gear assembly enclosed in the auxiliary gear casing and comprising an auxiliary power transfer shaft parallel with the main power transfer shaft, a first wheel drive gear unit enclosed in the auxiliary gear casing and comprising a differential gear assembly including an input member rotatable with one of the gears of the shift gear assembly and output members connected to a first pair of road wheels, a second wheel drive gear unit connected to a second pair of road wheels of the vehicle, and a right-angle power transfer gear unit enclosed in the auxiliary gear casing and operative to transmit driving power from the auxiliary power transfer shaft to the second wheel drive gear unit.

8 Claims, 3 Drawing Figures

FOUR-WHEEL VEHICLE DRIVE SYSTEM

FIELD OF THE INVENTION

The present invention relates to a four-wheel drive system for an automotive vehicle having at least two pairs of road wheels consisting of a pair of front road wheels and a pair of rear road wheels and, more particularly, to a transaxle mechanism for use in a four-wheel drive system for such a wheeled vehicle.

DESCRIPTION OF THE PRIOR ART

In an automotive vehicle equipped with a four-wheel drive system, it is desired to provide, in addition to clutch and power transmission gear units, low-and-high speed shift clutch means adapted to provide selection between two gear ratios for each of the gear ratios available in the power transmission gear unit. A four-wheel drive system of this nature may be realized if gears and a shaft to support the gears may be additionally incorporated into the transmission gear unit forming part of the drive system. Whereas, a transaxle mechanism for a four-wheel drive system can be constructed by incorporating a final reduction gear into a two-wheel drive transmission gear unit for use with a laterally or transversely positioned internal combustion engine and devoid of low-and-high speed shift clutch means. If it is desired to have low-and-high speed shift clutch means provided in such a transaxle mechanism, wide and basic modification would required of the transaxle mechanism since the gears and the shaft to construct the low-and-high speed shift clutch means must be additionally incorporated into the power transmission unit of the mechanism as above noted. In order, furthermore, that the road wheels of the vehicle using such a four-wheel drive system be driven for rotation in proper directions, the internal combustion engine for use with the four-wheel drive system must be arranged so that the direction of rotation of the output shaft thereof becomes opposite to that of an engine for use with a two-wheel drive system. Extreme difficulties have thus been encountered in modifying a transaxle mechanism of a two-wheel drive system into a four-wheel drive system or vice versa. The present invention contemplates elimination of these drawbacks of known four-wheel drive systems of the described characters. It is, accordingly, a prime object of the present invention to provide a four-wheel drive system including a transaxle mechanism which has low-and-high speed shift clutch means incorporated therein and which can be constructed by slightly modifying a transaxle mechanism originally designed for use in a two-wheel drive system of an automotive vehicle.

SUMMARY OF THE INVENTION

In accordance with the present invention, there is provided a four-wheel drive system for a vehicle with first and second pairs of road wheels, comprising a power unit positioned closer to the first pair of road wheels than to the second pair of road wheels and having an output shaft rotatable about an axis in a lateral direction of the vehicle; a power transmission gear unit including transmission input and output shafts each having an axis of rotation in a lateral direction of the vehicle; a final reduction gear rotatable about an axis parallel with the respective axes of rotation of the transmission input and output shafts, the transmission output shaft being held in driving engagement with the final reduction gear; a main transaxle gear casing having enclosed therein the transmission gear unit and the final reduction gear; an auxiliary transaxle gear casing secured to the main transaxle gear casing; a hollow main power transfer shaft enclosed within the auxiliary transaxle gear casing and rotatable about an axis substantially aligned with the axis of rotation of the final reduction gear; a low-and-high speed shift gear assembly enclosed within the auxiliary transaxle gear casing and comprising an auxiliary power transfer shaft substantially parallel with the main power transfer shaft, at least two main power transfer gears rotatable about axes substantially aligned with the axis of rotation of the main power transfer shaft, and at least two auxiliary power transfer gears mounted on the auxiliary power transfer shaft and rotatable about axes substantially aligned with the axis of rotation of the auxiliary power transfer shaft; a first wheel drive gear unit enclosed within the auxiliary transaxle gear casing and comprising a differential gear assembly including an input member rotatable with one of the main power transfer gears about an axis substantially aligned with the axis of rotation of the main power transfer shaft and a pair of output members operatively connected to the first pair of road wheels through a pair of side gear shafts, respectively, at least one of the side gear shafts axially extending through the hollow main power transfer shaft; a second wheel drive gear unit comprising a differential gear assembly operatively connected to the second pair of road wheels of the vehicle; and a right-angle power transfer gear unit enclosed within the auxiliary transaxle gear casing and operative to transmit driving power from the auxiliary power transfer shaft to the differential gear assembly of the second wheel drive gear unit in a fore-and-aft direction of the vehicle.

DESCRIPTION OF THE DRAWINGS

The features and advantages of a transaxle mechanism of a four-wheel drive system proposed by the present invention will be more clearly understood from the following description take in conjunction with the accompanying drawings in which.

DESCRIPTION OF THE PREFERRED EMBODIMENT

Figure 1:
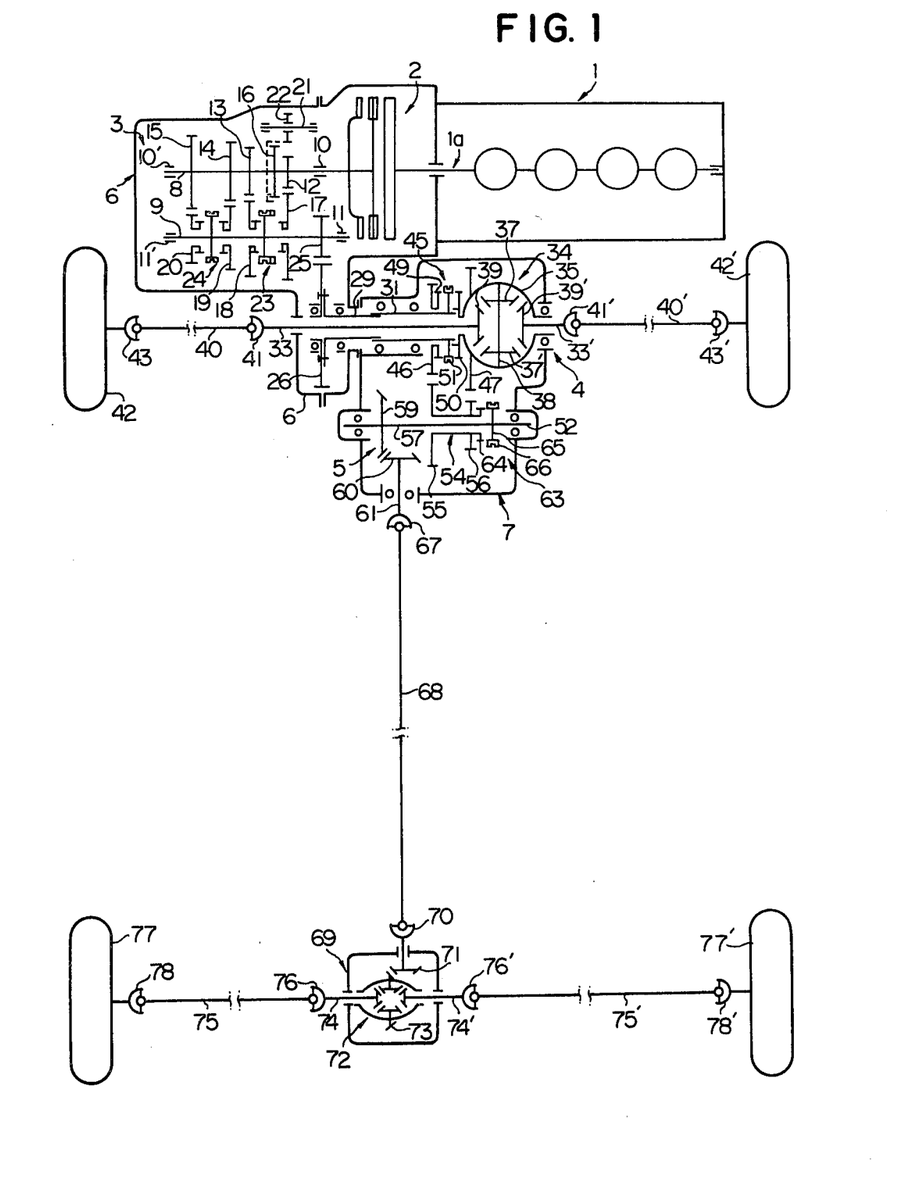
FIG. 1 is a schematic plan view showing a preferred embodiment of a four-wheel drive system according to the present invention.

Referring to the drawings, a four-wheel drive system embodying the present invention comprises a transaxle mechanism in combination with a power unit typically constituted by an internal combustion engine which is schematically indicated at 1 in FIG. 1. The internal combustion engine 1 has a power output shaft 1a which is constituted by, for example, the crankshaft of an ordinary internal combustion engine for automotive use. The four-wheel drive system proposed by the present invention is to be used in a vehicle having the engine positioned laterally or transversely of the vehicle body. The engine 1 is thus installed on the body structure (not shown) of a wheeled vehicle in such a manner that the output shaft 1a extends in a lateral direction of the vehicle body. The four-wheel drive system embodying the present invention is further assumed as being incorporated in an automotive vehicle of the front-engine design and, thus, the engine 1 is positioned in a front portion of the vehicle body. As is further shown in FIG. 1 of the drawings, such a four-wheel drive system includes a transaxle mechanism comprising a clutch unit 2, a power transmission gear unit 3, a front-wheel drive gear unit 4 and a right-angle power transfer gear unit 5 as schematically shown in FIG. 1. In the embodiment of the present invention as herein shown, it is assumed that the clutch unit 2 is of the friction-disc type and that the power transmission gear unit 3 is of the manually operated synchromesh type. The clutch unit 2, power transmission gear unit 3, front-wheel drive gear unit 4 and right-angle power transfer gear unit 5 thus constituting the transaxle mechanism of the drive system embodying the present invention are enclosed within a common transaxle casing structure which is fixedly mounted on the vehicle body. The transaxle casing structure is largely composed of a main transaxle gear casing 6 having the clutch unit 2 and transmission gear unit 3 enclosed therein and an auxiliary transaxle gear casing 7 having the front-wheel drive gear unit 4 and the right-angle power transfer gear unit 5 enclosed therein.

The power transmission gear unit 3 comprises input and output shafts 8 and 9 axially extending in lateral directions of the vehicle body. The transmission input shaft 8 has opposite end portions respectively journaled in bearings 10 and 10' received in the main transaxle gear casing 6 and axially extends in alignment with the axis of rotation of the engine output shaft 1a. The transmission output shaft 9 likewise has opposite end portions respectively journaled in bearings 11 and 11' received in the main transaxle gear casing 6 and axially extends in parallel with the transmission input shaft 8. The transmission input shaft 8 is selectively coupled to and uncoupled from the engine output shaft 1a through the clutch unit 2. The transmission gear unit 3 is assumed to be of the four-forward-speed and one-reverse-speed type and thus comprises five power input gears coaxially rotatable with the transmission input shaft 8 and consisting of first-speed, second-speed, third-speed and fourth-speed forward drive gears 12, 13, 14 and 15, and a reverse drive gear 16. On the other hand, the transmission output shaft 9 has mounted thereon four driven gears coaxially rotatable independently of one another on the shaft 9 and consisting of first-speed, second-speed, third-speed and fourth-speed driven gears 17, 18, 19 and 20. The first-speed to fourth-speed driven gears 17 to 20 are held in mesh with the first-speed to fourth-speed drive gears 12 to 15, respectively, on the transmission input shaft 8. The transmission gear unit 3 further comprises a reverse idler shaft 21 having an idler gear 22 coaxially rotatable thereon and axially movable on the shaft 21 into and out of an axial position to be held in mesh with the reverse drive gear 16 on the transmission input shaft 8 through a suitable mechanical linkage as indicated by broken lines in FIG. 1. The reverse idler shaft 21 also extends in parallel with the transmission input shaft 8 and has opposite end portions secured to the main transaxle gear casing 6.

The transmission gear unit 3 further comprises first-second and third-fourth speed synchronizer clutch assemblies 23 and 24, each of which is coaxially rotatable with the transmission output shaft 9. The first-second speed synchronizer clutch assembly 23 is provided between the first-speed and second-speed driven gears 17 and 18 and is selectively engageable with these gears 17 and 18. Likewise, the third-fourth speed synchronizer clutch assembly 24 is provided between the third-speed and fourth-speed driven gears 19 and 20 and is selectively engageable with the gears 19 and 20. The transmission output shaft 9 has fixedly mounted thereon a transmission output gear 25.

Figure 2:
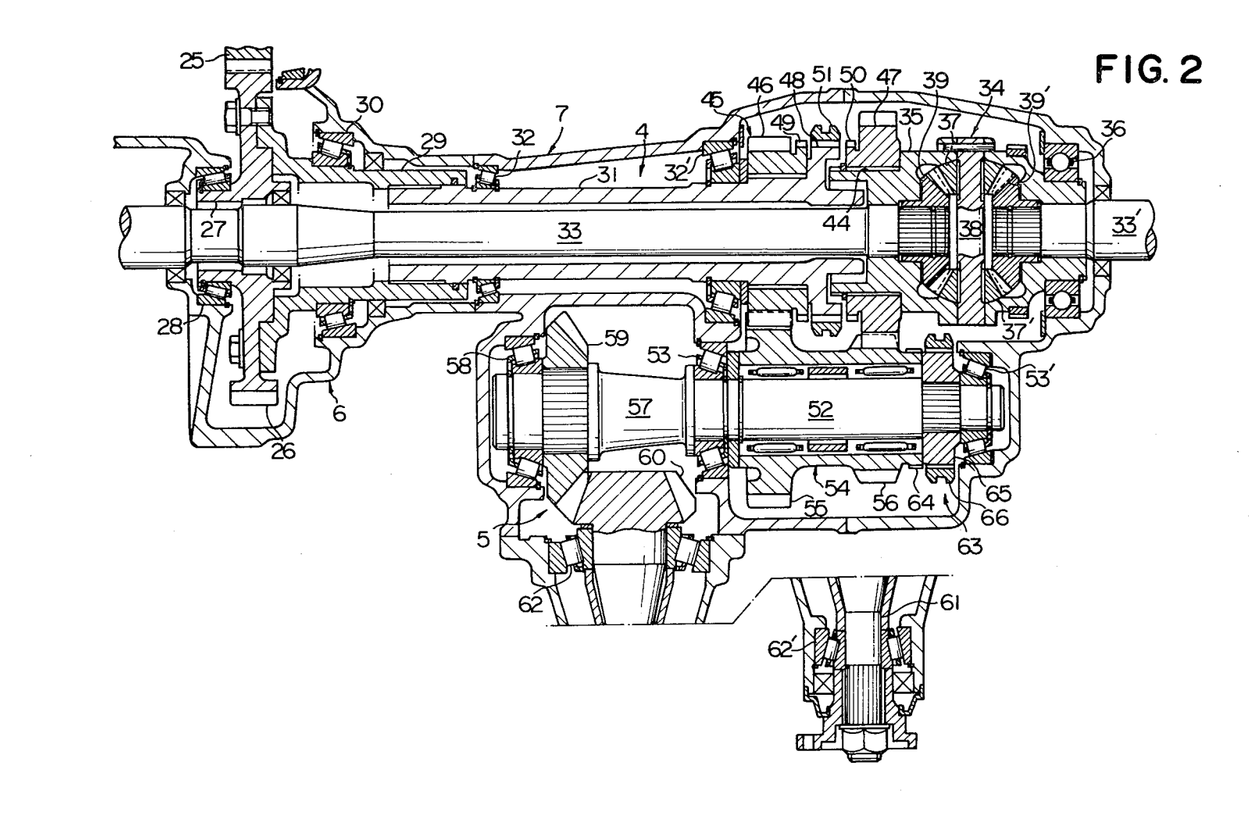
FIG. 2 is a sectional view of the transaxle mechanism forming part of the four-wheel drive system shown in FIG. 1.

As will be better seen from FIG. 2 of the drawings, the main transaxle gear casing 6 has further enclosed therein an annular transmission final reduction gear 26 rotatable about an axis directed laterally or transversely of the vehicle body, viz., parallel with the axes of rotation of the transmission input and output shafts 8 and 9. The transmission final reduction gear 26 has a boss portion 27 journaled in a bearing 28 received in the main transaxle gear casing 6 and is held in mesh with the above mentioned transmission output gear 25. To the transmission final reduction gear 26 is securely coupled an intermediate hollow shaft 29 rotatable about an axis aligned with the axis of rotation of the final reduction gear 26 and journaled in a bearing 30 received in the main transaxle gear casing 6. The intermediate hollow shaft 29 is securely connected or splined to a main power transfer hollow shaft 31 axially extending from the hollow shaft 29 opposite to the transmission final reduction gear 26. The main power transfer shaft 31 is thus rotatable with the intermediate hollow shaft 29 and the transmission final reduction gear 26 about an axis aligned with the axis of rotation of the final reduction gear 26 and has axial portions respectively journaled in bearings 32 and 32' received in the auxiliary transaxle gear casing 7.

The main power transfer shaft 31 forms part of the front-wheel drive gear unit 4 which further comprises a pair of front side gear shafts 33 and 33' having respective axes of rotation aligned with the axis of rotation of the above described transmission final reduction gear 26 and thus also parallel with the input and output shafts 8 and 9 of the transmission gear unit 3 (FIG. 1). One front side gear shaft 33 axially extends outwardly from the main transaxle gear casing 6 through the transmission final reduction gear 26 and the intermediate and main hollow shafts 29 and 31, and the other front side gear shaft 33' extends opposite to the side gear shaft 33 outwardly from the auxiliary transaxle gear casing 7. As shown in FIG. 2, the side gear shafts 33 and 33' have externally serrated inner end portions, respectively, and axially extend in opposite directions laterally or transversely of the vehicle body from a front-wheel differential gear assembly 34 which forms part of the front-wheel drive gear unit 4.

The front-wheel differential gear assembly 34 is also enclosed within the auxiliary transaxle gear casing 7 and comprises a gear housing 35 which is rotatable about an axis aligned with the axes of rotation of the side gear shafts 33 and 33'. The gear housing 35 constitutes an input member of the differential gear assembly 34 and has an axial boss portion slidably receiving an axial portion of the side gear shaft 33' and journaled in a bearing 36 received in the auxiliary transaxle gear casing 7 as shown. The gear housing 35 has carried therein a pair of differential bevel pinions 37 and 37' which are rotatably mounted on a common pinion cross shaft 38 which is secured to the gear housing 35 and which axially extends at right angles to the axis of rotation of the gear housing 35. The individual bevel pinions 37 and 37' are, thus, rotatable not only together with the gear housing 35 and the cross shaft 38 about the axis of rotation of the gear housing 35 but also independently of one another about the center axis of the cross shaft 38, viz., about an axis perpendicular to the axis of rotation of the gear housing 35. The differential bevel pinions 37 and 37' intervene between and are held in mesh with a pair of differential side bevel gears 39 and 39' which are also carried in the differential gear housing 35 and which are rotatable about the axis of rotation of the gear housing 35. The side bevel gears 39 and 39' constitute power output members of the differential gear assembly 34 and are splined to the serrated inner end portions of the side gear shafts 33 and 33', respectively, which extend outwardly from the gear housing 35. One side gear shaft 33 extends outwardly from the gear housing 35 through the hollow shafts 29 and 31 and the other side gear shaft 33' extends outwardly from the gear housing 35 through the above mentioned axial boss portion of the gear housing 35 in the opposite direction to the side gear shaft 33. The front side gear shafts 33 and 33' form part of front axle assemblies and are operatively connected at their axially outer ends to front wheel drive shafts 40 and 40' through suitable coupling means such as constant-velocity or universal couplings 41 and 41', respectively, as shown in FIG. 1. The front wheel drive shafts 40 and 40' also extend in a lateral direction of the vehicle body and are in turn connected at their outer axial ends to the front wheel axles for front road wheels 42 and 42' via suitable coupling means such as constant-velocity or universal couplings 43 and 43', respectively. The differential gear housing 35 has a cylindrical externally serrated axial extension 44 axially projecting opposite to the boss portion of the housing 35 and slidably receiving an axial portion of the front side gear shaft 33.

The front-wheel drive gear unit 4 comprises, in addition to the above described differential gear assembly 34, a low-and-high speed shift gear assembly 45 also enclosed within the auxiliary transaxle gear casing 7. The low-and-high speed shift gear assembly 45 axially intervenes between the main power transfer shaft 31 and the gear housing 35 of the front-wheel differential gear assembly 34 and is adapted to transmit driving power from the shaft 31 to the gear housing 35 selectively at two different gear ratios. In the embodiment shown in FIG. 2, such a low-and-high speed shift gear assembly 45 comprises an annular first main power transfer gear 46 coaxially rotatable on an axial portion of the hollow shaft 31 and an internally serrated, annular second main power transfer gear 47 splined to the externally serrated axial extension 44 of the differential gear housing 35 and axially spaced apart from the first main power transfer gear 46. The low-and-high speed shift gear assembly 45 has an externally serrated flange portion axially intervening between these first and second main power transfer gears 46 and 47 and constituting a sleeve carrier 48. The main power transfer gears 46 and 47 have externally serrated axial extensions constituting first and second or low-speed and high-speed clutch gears 49 and 50, respectively, which are located axially adjacent the opposite axial ends, respectively, of the sleeve carrier 48 and which are equal in diameter to the sleeve carrier 48, which thus axially intervenes between the clutch gears 49 and 50. An internally serrated annular coupling sleeve 51 is held in mesh with the sleeve carrier 48 and is axially movable on the sleeve carrier 48 selectively in one direction into engagement with the low-speed clutch gear 49 and in the other direction into engagement with the high-speed clutch gear 50. The first and second main power transfer gears 46 and 47 thus arranged are assumed to have $n_1$ and $n_2$ numbers of gear teeth, respectively. The low-and-high speed shift gear assembly 45 further comprises an auxiliary power transfer gear shaft 52 axially extending in parallel with the main hollow shaft 31 and having opposite axial end portions respectively journaled in bearings 53 and 53' received in the auxiliary transaxle gear casing 7. The auxiliary power transfer gear shaft 52 has rotatably carried thereon a unitary auxiliary power transfer gear member 54 having first and second auxiliary power transfer gear portions 55 and 56 which are axially spaced apart from each other on the shaft 52 and which are held in mesh with the above described first and second main power transfer gears 46 and 47, respectively. The gear portions 55 and 56 are assumed to have $N_1$ and $N_2$ numbers of gear teeth, respectively. In this instance, the number $N_1$ of the gear teeth of the first auxiliary power transfer gear portion 55 is equal to the number $n_1$ of the gear teeth of the first main power transfer gear 46, and the number $N_2$ of the gear teeth of the second auxiliary power transfer gear portion 56 is smaller than each of the number $N_1$ of the gear teeth of the second auxiliary power transfer gear portion 56 and the number $n_2$ of the gear teeth of the second main power transfer gear 47. The coupling sleeve 51 is formed with an external circumferential groove through which a shifting fork (not shown) is held in engagement with the sleeve 51. The shifting fork in turn is connected through a mechanical linkage to suitable manually or otherwise operated low-and-high speed shift control means (not shown) so that the coupling sleeve 51 is axially moved selectively into or out of engagement with one of the low-speed and high-speed clutch gears 49 and 50 as above described. The auxiliary power transfer gear shaft 52 has an externally serrated axial portion adjacent its axial end portion journaled in the bearing 53' as shown.

On the other hand, the right-angle power transfer gear unit 5 is adapted to transmit driving power from the above mentioned auxiliary power transfer gear shaft 52 to the rear-wheel driveline. In the shown embodiment of a four-wheel drive system according to the present invention, the right-angle power transfer gear unit 5 comprises a rear-wheel drive input shaft 57 integral or securely coupled at one axial end with the above mentioned auxiliary power transfer gear shaft 52 and having, opposite to the drive shaft 52, an externally serrated axial portion and an axial end portion journaled in a bearing 58 received in the auxiliary transaxle gear casing 7. The gear unit 5 further comprises a combination of a driving bevel gear 59 and a driven bevel gear 60. The driving bevel gear 59 is internally serrated and is splined to the rear-wheel drive input shaft 57 and is coaxially rotatable with the shaft 57 and accordingly with the auxiliary power transfer gear shaft 52. The driven bevel gear 60 is held in mesh with the driving bevel gear 59 and is rotatable about an axis perpendicular to the axis of rotation of the rear-wheel drive input shaft 57, viz., about an axis in a fore-and-aft direction of the vehicle body. The driven bevel gear 60 has a rearwardly extending stem portion 61 journaled in bearings 62 and 62' received in the auxiliary transaxle gear casing 7.

The four-wheel drive system according to the present invention further comprises a two-wheel/four-wheel drive shift clutch assembly 63 adapted to selectively establish or cut off driving connection from the main hollow shaft 31 to the rear-wheel driveline. In the embodiment herein shown, the clutch assembly 63 comprises at least three clutch members consisting of a first clutch member coaxially rotatable with one of the auxiliary power transfer shaft 52 and the power transfer gear member 54, a second clutch member coaxially rotatable with the other of the power transfer shaft and gear member 52 and 54, and a third clutch member coaxially rotatable with one of the first and second clutch members and axially movable thereon selectively into and out of engagement with the other of the first and second clutch members. In the embodiment herein shown, the first clutch member is constituted by a first clutch gear 64 integral or otherwise rotatable with the power transfer gear member 54, while the second clutch member is constituted by an internally serrated annular second clutch gear 65 splined to the externally serrated axial portion of the power transfer gear shaft 52. The third clutch member of the clutch assembly 63 is constituted by an internally serrated, annular coupling sleeve 66 which is splined to the second clutch gear 65. The coupling sleeve 66 is axially movable on the second clutch gear 65 selectively into and out of engagement with the first clutch gear 64. The coupling sleeve 66 is formed with an external circumferential groove having fitted therein a clutch actuating fork (not shown). Though not shown in the drawings, the clutch actuating fork is connected through a suitable mechanical linkage to manually or otherwise operated two-wheel/four-wheel drive shift control means so that the coupling sleeve 66 is axially moved selectively into or out of engagement with the clutch gear 64.

The stem portion 61 of the driven bevel gear 60 projects rearwardly from the gear casing 7 through an opening formed in the casing 7 as shown in FIG. 2 and is connected through a suitable joint unit such as a constant-velocity or universal coupling 67 to a propeller shaft 68 extending rearwardly from the coupling 67 in a fore-and-aft direction of the vehicle body as shown in FIG. 1. The propeller shaft 68 forms part of the rear wheel driveline and is connected at its rear end to a rear-wheel drive gear unit 69 through a constant-velocity or universal coupling 70. The rear-wheel drive gear unit 69 comprises a power input member or drive bevel gear 71 connected to the propeller shaft 68 through the coupling 70, a rear-wheel differential gear assembly 72 including a bevel gear 73 rotatable with the gear housing of the gear assembly 72 and held in mesh with the drive bevel gear 71, and a pair of power output members or rear side gear shafts 74 and 74' projecting outwardly from the gear housing of the differential gear assembly 72. These output members or rear side gear shafts 74 and 74' of the rear-wheel drive gear unit 69 axially extend in a lateral direction of the vehicle body from the gear unit 69 similarly to the front side gear shafts 33 and 33' and are connected to rear-wheel drive shafts 75 and 75' through constant-velocity or universal couplings 76 and 76', respectively. The rear-wheel drive gear unit 69 is constructed in such a manner as to produce between the input member and each of the output members a gear ratio approximately equal to that achieved in the front-wheel drive gear unit 4. If, thus, the drive and driven bevel gears 59 and 60 of the right-angle power transfer gear unit 5 are assumed to have $m_1$ and $m_2$ numbers of gear teeth, respectively, the gear ratio achieved in the rear-wheel drive gear unit 69 is approximately equal to $n_2/N_2 \times m_1/m_2$. The rear-wheel drive shafts 75 and 75' also extend in a lateral direction of the vehicle body and are connected at their outer axial ends to the rear wheel axles for rear road wheels 77 and 77' through constant-velocity or universal couplings 78 and 78', respectively.

Description will now be made regarding the operation of the four-wheel drive system including the transaxle mechanism constructed and arranged as hereinbefore described.

When the engine 1 is in operation and the clutch unit 2 is in a coupled condition, the driving power delivered from the output shaft 1a of the engine 1 is transmitted through the clutch unit 2 to the input shaft 8 of the power transmission gear unit 3. If, under these conditions, one of the driven gears 17 to 20 on the transmission output shaft 9 is coupled to the shaft 9 through the associated synchronizer clutch assembly 23 or 24 or the reverse idler gear 22 is held in mesh with the reverse drive gear 16 and the synchronizer clutch assembly 23, the driving power carried to the transmission input shaft 8 is transmitted to the transmission output shaft 9 through the selected pair of gears on the shafts 8 and 9 or through the gears 16 and 22. The transmission output shaft 9 is, as a result, driven for rotation at a speed proportioned in the selected ratio to the rotational speed of the transmission input shaft 8.

The rotation of the transmission output shaft 9 is transmitted via the transmission output gear 25 on the shaft 9 to the final reduction gear 26 connected to the intermediate hollow shaft 29. The rotation of the final reduction gear 26 in turn is carried through the intermediate hollow shaft 29 to the main hollow shaft 31. If, now, the shifting fork of the low-and-high speed shift gear assembly 45 is held in a condition having the annular coupling sleeve 51 held in an axial position engaged by both of the sleeve carrier 48 integral with the main hollow shaft 31 and the low-speed clutch gear 49 integral with the first main power transfer gear 46, the driving power carried from the power transmission gear unit 3 (FIG. 1) to the main hollow shaft 31 as discussed above is transmitted to the first main power transfer gear 46 through the sleeve carrier 48, coupling sleeve 51 and low-speed clutch gear 49 and further through the first and second auxiliary power transfer gear portions 55 and 56 of the auxiliary power transfer gear member 54 to the second main power transfer gear 47 on the axial extension 44 of the front-wheel differential gear assembly 34. Accordingly, the driving power transmitted from the main hollow shaft 31 to the first main power transfer gear 46 is reduced in speed by means of the second auxiliary power transfer gear portion 56 and the second main power transfer gear 47 so that the second main power transfer gear 47 is driven for rotation at a speed lower than the speed of rotation of the main hollow shaft 31. If, on the other hand, the shifting fork of the low-and-high speed shift gear assembly 45 is held in a condition having the coupling sleeve 51 held in an axial position engaged by both of the sleeve carrier 48 integral with the main hollow shaft 31 and the high-speed clutch gear 50 integral with the second main power transfer gear 47, the driving power carried from the power transmission gear unit 3 (FIG. 1) to the main hollow shaft 31 as discussed above is transmitted through the sleeve carrier 48, coupling sleeve 51 and high-speed clutch gear 50 to the second main power transfer gear 47 on the axial extension 44 of the front-wheel differential gear assembly 34. Under these conditions, the second main power transfer gear 47 is driven for rotation at a speed equal to the speed of rotation of the main hollow shaft 31 with the first main power transfer gear 46 rotating freely on the main hollow shaft 31.

The rotation of the second main power transfer gear 47 which is thus driven selectively at a speed lower than or equal to the speed of rotation of the main hollow shaft 31 is transmitted to the gear housing 35 of the differential gear assembly 34 through the axial extension 44 of the housing 35 and causes the gear housing 35 to rotate about the aligned axes of rotation of the side gear shafts 33 and 33'. The driving power thus transmitted from the final reduction gear 26 to the gear housing 35 of the front-wheel differential gear assembly 34 is carried to the bevel pinions 37 and 37' of the differential gear assembly 34 through the pinion cross shaft 38 and drives the differential bevel pinions 37 and 37' for rotation with the housing 35 about axes respectively aligned with the center axes of the front side gear shafts 33 and 33' and further for rotation with respect to the gear housing 35 about the center axis of the pinion cross shaft 38. The differential bevel pinions 37 and 37' in turn drive the differential side bevel gears 39 and 39' for rotation with respect to the gear housing 35 about an axis at right angles to the center axis of the pinion cross shaft 38. Thus, the driving power transmitted to the differential gear assembly 34 is split into two output components, which are transmitted to the side gear shafts 33 and 33' and further through these shafts 33 and 33', couplings 41 and 41', front-wheel drive shafts 40 and 40' and couplings 43 and 43' to the wheel axles of the front road wheels 42 and 42', respectively (FIG. 1).

On the other hand, the rotation of the intermediate hollow shaft 29 is transmitted to the auxiliary power transfer gear member 54 of the low-and-high speed shift gear assembly 45 either through the first main power transfer gear 46 and the first auxiliary power transfer gear portion 55 with the coupling sleeve 51 held in engagement with the first main power transfer gear 46 or through the second main power transfer gear 47 and the second auxiliary power transfer gear portion 56 with the coupling sleeve 51 held in engagement with the second main power transfer gear 47. If, in this instance, the shifting fork of the two-wheel/four-wheel drive shift clutch assembly 63 is held in a condition having the coupling sleeve 66 disengaged from the first clutch gear 64, the second clutch gear 65 and accordingly the auxiliary power transfer gear shaft 52 are isolated from the driving power transmitted to the auxiliary power transfer gear member 54 and are allowed to idle on the power transfer gear shaft 52. Under these conditions, the driving power transmitted to the power transfer gear shaft 52 is not carried over to the right-angle power transfer gear unit 5 so that only the front road wheels 42 and 42' of the vehicle are driven for rotation and, as a consequence, the vehicle operates in a two-wheel driven mode. If, on the other hand, the shifting fork of the two-wheel/four-wheel drive shift clutch assembly 63 is a condition having the coupling sleeve 66 held in an axial position engaging the first clutch gear 64, the driving power carried from the main hollow shaft 31 to the auxiliary power transfer gear member 54 as above described is transmitted to the power transfer gear shaft 52 through the first clutch gear 64, coupling sleeve 66 and second clutch gear 65 and drives the shaft 52 for rotation about the center axis thereof. The power transfer gear shaft 52 in turn drives the driving bevel gear 59 of the right-angle power transfer gear unit 5 for rotation with the input shaft 57, and the driving bevel gear 59 drives the driven bevel gear 60 for rotation about the axis thereof in a fore-and-aft direction of the vehicle body. The driving power transmitted to the gear shaft 52 is, thus, carried not only to the front road wheels 42 and 42' of the vehicle as above described but also to the rear-wheel drive gear unit 69 (FIG. 1) via the coupling 67, propeller shaft 68 and coupling 70. The rear-wheel drive gear unit 69 splits the input driving power into two driving power components respectively driving the rear side gear shafts 74 and 74' extending from the gear unit 69. The driving power components are further transmitted via the couplings 76 and 76', rear-wheel drive shafts 75 and 75' and the couplings 78 and 78' to the wheel axles of the rear road wheels 77 and 77', respectively, of the vehicle. The front road wheels 42 and 42' and the rear road wheels 77 and 77' of the vehicle are thus driven for rotation so that the vehicle operates in a four-wheel driven mode.

Figure 3:
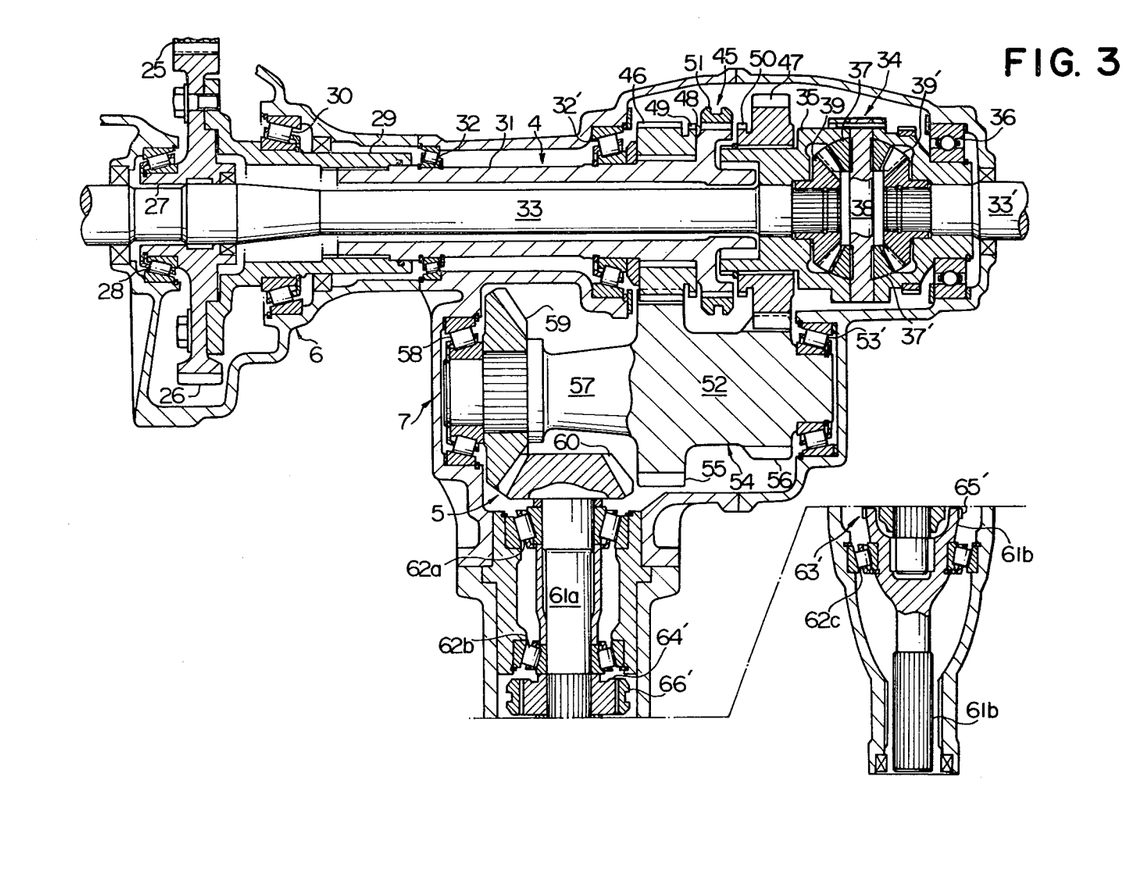
FIG. 3 is a view similar to FIG. 2 but shows a modification of the transaxle mechanism shown in FIG. 2.

While the two-wheel/four-wheel drive shift clutch assembly 63 in the hereinbefore described embodiment of the present invention is provided between the auxiliary power transfer shaft 52 and the power transfer gear member 54 of the low-and-high speed shift gear assembly 45, the two-wheel/four-wheel drive shift clutch assembly 63 of the four-wheel drive system according to the present invention may be provided on the driven bevel gear 60. FIG. 3 shows the transaxle mechanism of an embodiment of a four-wheel drive system using such a two-wheel/four-wheel drive shift clutch assembly 63.

In the right-angle power transfer gear unit 5 of the transaxle mechanism shown in FIG. 3, the stem portion of the driven bevel gear 60 is split into first and second or front and rear axial sections 61a and 61b which are axially separate from each other. The front axial section 61a is integral with the threaded head portion of the bevel gear 60 and is journaled in bearings 62a and 62b received in the auxiliary transaxle gear casing 7, while the rear axial section 61b is journaled in a bearing 62c also received in the transaxle gear casing 7. The front axial section 61a has an externally serrated axial portion as shown. The rear axial section 61b projects rearwardly from the gear casing 7 through an opening formed at the rear end of the casing 7 as shown and is connected through a suitable joint unit such as a constant-velocity or universal coupling to a propeller shaft axially extending rearwardly from the coupling in a fore-and-aft direction of the vehicle body as in the four-wheel drive system described with reference to FIGS. 1 and 2.

The two-wheel/four-wheel drive shift clutch assembly, now designated by 63', is adapted to selectively establish or cut off driving connection from the front axial section 61a to the rear axial section 61b of such a driven bevel gear 60. Thus, the clutch assembly 63' comprises at least three clutch members consisting of a first clutch member coaxially rotatable with one of the front and rear axial sections 61a and 61b, a second clutch member coaxially rotatable with the other of the axial sections 61a and 61b, and a third clutch member coaxially rotatable with one of the first and second clutch members and axially movable thereon selectively into and out of engagement with the other of the first and second clutch members. In the embodiment shown in FIG. 3, the first clutch member is constituted by an externally serrated first clutch gear 64' splined to the serrated axial portion of the front axial section 61a, while the second clutch member is constituted by an externally serrated second clutch gear 65' integral with the rear axial section 61b. The third clutch member of the two-wheel/four-wheel drive shift clutch assembly 63' is constituted by an internally serrated, annular coupling sleeve 66' which is splined to serrated axial portion of the first clutch gear 64'. The coupling sleeve 66' is axially movable on the first clutch gear 64' selectively into and out of engagement with the second clutch gear 65'. The coupling sleeve 66' is formed with a circumferential groove having fitted therein a clutch actuating fork (not shown). Though not shown in the drawings, the clutch actuating fork is connected through a suitable mechanical linkage to manually or otherwise operated two-wheel/four-wheel drive shift control means so that the coupling sleeve 66' is axially moved selectively into or out of engagement with the clutch gear 65'.

In the transaxle mechanism shown in FIG. 3, furthermore, the auxiliary power transfer gear member 54 of the low-and-high speed shift gear assembly 45 is integral with the auxiliary power transfer gear shaft 52. Thus, driving power is constantly transmitted from the main hollow shaft 31 to the driving bevel gear 59 of the right-angle power transfer gear unit 5 through the first or second main power transfer gear 46 or 47 of the low-and-high speed shift gear assembly 45 and the first or second auxiliary power transfer gear portions 55 and 56, respectively, of the auxiliary power transfer gear member 54. The driving bevel gear 59 thus drives the driven bevel gear 60 for rotation about the center axis thereof. If, in this instance, the shifting fork of the two-wheel/four-wheel drive shift clutch assembly 63' is held in a condition having the coupling sleeve 66' held in an axial position disengaged from the first clutch gear 64', the second clutch gear 65' and accordingly the rear axial section 61b of the driven bevel gear 60 are isolated from the driving power transmitted to the front axial section 61a of the bevel gear 60 and are allowed to idle on the auxiliary power transfer gear shaft 52. Under these conditions, the driving power transmitted to the front axial section 61a of the driven bevel gear 60 is not coupled to the right-angle power transfer gear unit 5 so that only the front road wheels 42 and 42' of the vehicle are driven for rotation and, as a consequence, the vehicle operates in a two-wheel driven mode. If, on the other hand, the shifting fork of the two-wheel/four-wheel drive shift clutch assembly 63' is a condition having the coupling sleeve 66' held in an axial position engaging the second clutch gear 65', the driving power carried from the driving bevel gear 59 to the front axial section 61a of the driven bevel gear 60 as above described is transmitted to the rear axial section 61b of the bevel gear 60 through the first clutch gear 64', coupling sleeve 66' and second clutch gear 65' and drives the driven bevel gear 60 for rotation about the center axis thereof in a fore-and-aft direction of the vehicle body. The driving power transmitted to the gear shaft 52 is, thus, carried not only to the front road wheels of the vehicle as above described but also to the rear-wheel drive gear unit 69 (FIG. 1) via the propeller shaft and the couplings connected thereto. The rear-wheel final reduction and differential gear unit splits the input driving power into two driving power components respectively driving the rear side gear shafts extending from the gear unit. The driving power components are further transmitted via the rear-wheel drive shafts and the couplings connected thereto to the wheel axles of the rear road wheels, respectively, of the vehicle. The front road wheels and the rear road wheels of the vehicle are thus driven for rotation so that the vehicle operates in a four-wheel driven mode as described with reference to FIGS. 1 and 2.

While the power unit in the four-wheel drive system embodying the present invention has been assumed as being positioned in a front portion of the vehicle body, the power unit of a transaxle mechanism of a four-wheel drive system according to the present invention may be installed in a lengthwise middle or rear portion of the vehicle body.

While, furthermore, the system embodying the present invention has been described as using the power transmission system of the manually-operated type, it will be apparent that a four-wheel drive system according to the present invention may be of the type which uses a power transmission system of the automatically-operated type.

What is claimed is:

1. A four-wheel drive system for a vehicle with first and second pairs of road wheels, comprising a power unit positioned closer to the first pair of road wheels than to the second pair of road wheels and having an output shaft rotatable about an axis in a lateral direction of the vehicle;

a power transmission gear unit including transmission input and output shafts each having an axis of rotation in a lateral direction of the vehicle;

a final reduction gear rotatable about an axis parallel with the respective axes of rotation of the transmission input and output shafts, the transmission output shaft being held in driving engagement with said final reduction gear;

a main transaxle gear casing having enclosed therein said transmission gear unit and said final reduction gear;

an auxiliary transaxle gear casing secured to said main transaxle gear casing;

a hollow main power transfer shaft enclosed within the auxiliary transaxle gear casing and rotatable about an axis substantially aligned with the axis of rotation of said final reduction gear;

a low-and-high speed shift gear assembly enclosed within said auxiliary transaxle gear casing and comprising an auxiliary power transfer shaft substantially parallel with said main power transfer shaft, at least two main power transfer gears rotatable about axes substantially aligned with the axis of rotation of said main power transfer shaft, and at least two auxiliary power transfer gears mounted on said auxiliary power transfer shaft and rotatable about axes substantially aligned with the axis of rotation of the auxiliary power transfer shaft;

a first wheel drive gear unit enclosed within said auxiliary transaxle gear casing and comprising a differential gear assembly including an input member rotatable with one of said main power transfer gears about an axis substantially aligned with the axis of rotation of said main power transfer shaft and a pair of output members operatively connected to said first pair of road wheels through a pair of side gear shafts, respectively, at least one of said side gear shafts axially extending through said hollow main power transfer shaft;

a second wheel drive gear unit comprising a differential gear assembly operatively connected to the second pair of road wheels of the vehicle; and a right-angle power transfer gear unit enclosed within said auxiliary transaxle gear casing and operative to transmit driving power from said auxiliary power transfer shaft to the differential gear assembly of the second wheel drive gear unit in a fore-and-aft direction of the vehicle, said main power transfer gears consisting of a first main power transfer gear coaxially rotatable on said first main power transfer shaft and a second main power transfer gear coaxially rotatable with said input member of said differential gear assembly and said auxiliary power transfer gears consisting of first and second auxiliary power transfer gears rotatable with each other on said auxiliary power transfer gear shaft and held in mesh with the first and second main power transfer gears, respectively, said low-and-high speed shift gear assembly further comprising a coupling member coaxially rotatable with said main power transfer shaft and axially movable selectively in one direction into one of the first and second main power transfer gears and in the other direction into engagement with the other of the main power transfer gears.

2. A four-wheel drive system as set forth in claim 1, further comprising two-wheel/four-wheel drive shift clutch means which comprises a first clutch member rotatable with said auxiliary power transfer gears, a second clutch member rotatable with said auxiliary power transfer shaft, and a third clutch gear rotatable with one of the first and second clutch members and axially movable thereon selectively into and out of the other of the first and second clutch members.

3. A four-wheel drive system as set forth in claim 1, in which said main power transfer gears consist of a first main power transfer gear coaxially rotatable on said first main power transfer shaft and a second main power transfer gear coaxially rotatable with said input member of said differential gear assembly and in which said auxiliary power transfer gears consist of first and second auxiliary power transfer gears coaxially rotatable with said auxiliary power transfer shaft and held in mesh with the first and second main power transfer gears, respectively, said low-and-high speed shift gear assembly further comprising a coupling member coaxially rotatable with said main power transfer shaft and axially movable selectively in one direction into one of the first and second main power transfer gears and in the other direction into engagement with the other main power transfer gears.

4. A four-wheel drive system as set forth in claim 3, in which said right-angle power transfer means comprises a driving bevel gear rotatable with said auxiliary power transfer shaft and a driven bevel gear rotatable about an axis in a fore-and-aft direction of the vehicle body and held in mesh with said driving bevel gear, one of the driving and driven bevel gears having first and second axial sections separate from each other, the drive system further comprising two-wheel/four-wheel drive shift clutch means intervening between said first and second axial sections and operative to selectively provide and interrupt driving connection from the one of the first and second axial sections to the other.

5. A four-wheel drive system as set forth in claim 4, further comprising two-wheel/four-wheel drive shift clutch means which comprises a first clutch member rotatable with said first axial section, a second clutch member rotatable with said second axial section, and a third clutch gear rotatable with one of the first and second clutch members and axially movable thereon selectively into and out of the other of the first and second clutch members.

6. A four-wheel drive system as set forth in any one of claims 1 to 5, in which the number of the teeth of said second main power transfer gear is larger than the number of the teeth of said second auxiliary power transfer gear.

7. A four-wheel drive system as set forth in claim 6, in which the number of the teeth of said first main power transfer gear is substantially equal to the number of the teeth of said first auxiliary power transfer gear.

8. A four-wheel drive system as set forth in claim 7, in which the number of the teeth of said first auxiliary power transfer gear is larger than the number of the teeth of said second auxiliary power transfer gear.

* * * * *